United States Patent [19]

Nirasawa et al.

[11] Patent Number: 5,795,671
[45] Date of Patent: Aug. 18, 1998

[54] FUEL CELL HAVING ELECTROLYTE LAYER HELD BETWEEN ANODE AND CATHODE

[75] Inventors: Hitoshi Nirasawa; Takanori Kawachi; Takashi Ogawa, all of Yokohama; Kenji Murata, Tokyo, all of Japan

[73] Assignee: Kabushiki Kaisha Toshiba, Kawasaki, Japan

[21] Appl. No.: 816,894

[22] Filed: Mar. 13, 1997

[30] Foreign Application Priority Data

Mar. 18, 1996 [JP] Japan .................................. 8-088753

[51] Int. Cl.⁶ .................................................. H01M 8/14
[52] U.S. Cl. ........................................ 429/41; 429/16
[58] Field of Search ............................ 429/46, 16, 41, 429/30

[56] References Cited

U.S. PATENT DOCUMENTS

| | | | |
|---|---|---|---|
| 4,538,348 | 9/1985 | Vine et al. | 429/16 X |
| 4,540,640 | 9/1985 | Iacovangelo et al. | 429/46 X |
| 4,895,774 | 1/1990 | Ohzu et al. | 429/16 X |
| 5,256,498 | 10/1993 | Ohzu et al. | 429/16 |
| 5,529,856 | 6/1996 | Petri et al. | 429/41 |
| 5,580,673 | 12/1996 | Farooque et al. | 429/46 X |
| 5,595,832 | 1/1997 | Tomimatsu et al. | 429/16 |

OTHER PUBLICATIONS

Electrochemical Society Proceeding, vol. 93–3, Proceedings of the Third International Symposium on Carbonate Fuel Cell Technology High Temperature Materials and Battery Division, pp. 89–105, 1993, L. M. Paetsch, et al., "Review of Carbonate Fuel Cell Matrix and Electrolyte Developments" No Month.

*Primary Examiner*—Anthony Skapars
*Attorney, Agent, or Firm*—Oblon, Spivak, McClelland, Maier & Neustadt, P.C.

[57] ABSTRACT

A fuel cell having a plurality of stacked single cells in each of which an electrolyte layer is held between an anode and a cathode and between which a separator is interposed, wherein the electrolyte layer includes a sheet for holding the electrolyte containing, as the main component thereof, fine powder having a function of holding the electrolyte, and reinforcing ceramic fiber disposed in the sheet for holding the electrolyte to substantially run parallel to the surface of the sheet for holding the electrolyte.

5 Claims, 6 Drawing Sheets

FUEL CELL HAVING ELECTROLYTE LAYER HELD BETWEEN ANODE AND CATHODE

BACKGROUND OF THE INVENTION

The present invention relates to a fuel cell such as a molten carbonate fuel cell, and more particularly to a fuel cell having a stacked electrolyte member which is capable of effectively preventing generation of cracks.

In general, a fuel cell typified by a single molten carbonate fuel cell includes lithium carbonate, potassium carbonate and sodium carbonate serving as the electrolyte therein. The electrolyte are held by fine powder of lithium aminate or the like so that an electrolyte layer is formed. The electrolyte layer is, by a doctor blade method, formed into a sheet-shape electrolyte layer having a thickness of 0.2 mm to 1 mm such that an organic binder is employed as a binding material. A plurality of the thus-formed electrolyte layer sheets are used as the electrolyte layer in the fuel cell.

The fused carbonate fuel cell has a structure such that the electrolyte layer is held between an anode in the form of a porous sintered body containing nickel as a main component thereof and a cathode in the form of a porous member made of a nickel oxide. The anode region of the fuel cell is supplied with fuel gas, while the cathode region is supplied with oxidizing agent gas. Thus, electromotive reactions are caused to take place so that electricity is generated. The single cells are stacked through separators to form a stacked cell (a stack) which serves as a unit of a power generation system.

The stack has a structure such that an anode chamber serving as a passage for fuel gas which is reducing gas, a cathode chamber serving as a passage for oxidizing agent gas which is oxidizing gas and the inside portion of a container having an inert atmosphere are isolated from one another in view of the gas phase. That is, the separator isolates gas in the adjacent anode chamber and the cathode chamber; the electrolyte layer prevents direct combustion reactions between the fuel gas and the oxidizing agent gas; and the anode chamber, the cathode chamber and the inert atmosphere in the container are isolated from one another in the edge portion.

If the above-mentioned gas isolation cannot be realized perfectly, the fuel gas and the oxidizing agent gas induce direct combustion reactions. Also the incomplete gas isolation involving defective sealing results in the atmospheric gas being mixed into the anode chamber and the cathode chamber. It leads to a fact that the ratio of the fuel gas for use in electrochemical reactions, which exhibits an excellent efficiency in conversion to electric energy, is lowered unintentionally. As a result, the conversion efficiency of the power generation system deteriorates. What is worse, the temperature locally arises due to the crossover combustion, thus causing metal elements of the cell to be corroded. As a result, the life time of the stack cannot be elongated.

One of the problems above is exemplified by generation of cracks in the electrolyte layer. The cracks are easily generated in portions, such as an interface between an electrode and the edge portion in which the thermal expansion coefficient discontinuously changed when the molten carbonate fuel cell is turned on, turned off or restarted (when a thermally unstable operation of the cell is performed).

Hitherto, a variety of methods of preventing generation of cracks in the electrolyte layer occurring when the temperature is raised or lowered have been disclosed. For example, a method has been disclosed (in Japanese Patent Laid-Open No. 57-27569) in which ceramic particles having particle sizes larger than that of a holding material are added to serve as a crack arrester which generates a multiplicity of microcracks in order to prevent generation of large cracks. Another method has been disclosed which has the step of adding ceramic fiber into the electrolyte layer. Another method has been disclosed (in Japanese Patent Laid-Open No. 5-335024) in which a supporting spring is provided in order to make uniform, on the interface with an edge plate, reaction forces of the edge plate to a matrix in order to prevent concentration of stresses to the matrix.

However, although the simple addition of the crack arrester or the ceramic fiber attains a somewhat effect of preventing generation of large size cracks in the electrolyte layer when the temperature is raised or lowered, the positions at which cracks are generated cannot be controlled. However, frequency of generation of microcracks, causing a short circuit phenomenon, is raised unintentionally. As a result, a network of microcracks is formed with which direct combustion reaction between the fuel gas and the oxidizing agent gas can easily be induced.

Although the spring is disposed in the edge portion to prevent concentration of stresses to the matrix, the fact that the electrolyte layer has not satisfactory mechanical strength causes cracks restrained in the edge region to propagate to the reaction portion as the number of the heat cycles increases. Therefore, crossover and edge leak cannot satisfactorily be prevented.

An object of the present invention is to provide a fuel cell having a stacked electrolyte member capable of effectively preventing generation of a crack.

Another object of the present invention is to provide a fuel cell structured to effectively prevent generation of a crack to improve the efficiency in using fuel gas and oxidizing agent gas so as to minimize consumption attributable to unintentional combustion reactions and gas leakage and to prevent deterioration in the performance and to elongate the life time.

BRIEF SUMMARY OF THE INVENTION

The foregoing objects can be achieved by a fuel cell comprising a plurality of stacked single cells in each of which an electrolyte layer is held between an anode and a cathode and between which a separator is interposed, wherein the electrolyte layer includes a sheet for holding the electrolyte containing, as the main component thereof, fine powder having a function of holding electrolyte, and reinforcing ceramic fiber disposed in the sheet for holding the electrolyte to substantially run parallel to the surface of the sheet for holding the electrolyte.

The quantity of the added reinforcing ceramic fiber is 3 wt % to 30 wt %.

The above-mentioned objects can be achieved by a fuel cell comprising a plurality of stacked single cells in each of which an electrolyte layer is held between an anode and a cathode and between which a separator is interposed, wherein the electrolyte layer includes a sheet for holding the electrolyte containing, as the main component thereof, fine powder having a function of holding electrolyte and made of a porous body, and reinforcing ceramic fiber disposed in the sheet for holding the electrolyte to substantially run parallel to the surface of the sheet made of the porous body, and the length of the reinforcing ceramic fiber is larger than the thickness of the sheet for holding the electrolyte.

The quantity of the added reinforcing ceramic fiber is 3 wt % to 30 wt %.

The above-mentioned object can be achieved by a fuel cell comprising a plurality of stacked single cells in each of which an electrolyte layer is held between an anode and a cathode and between which a separator is interposed, wherein the electrolyte layer is in the form of a stacked member formed by combining a sheet for holding the electrolyte containing, as the main component thereof, fine powder having a function of holding electrolyte and made of a porous body and a cracking filler layer sheet containing, as the main component thereof, powder which is fined during an operation of the fuel cell, and the electrolyte layer contains reinforcing ceramic fiber disposed in the sheet for holding the electrolyte to substantially run parallel to the surface of the sheet made of the porous body.

The cracking filler layer is disposed more adjacent to the cathode than the anode.

The sheet for holding the electrolyte and the cracking filler layer sheet are allowed to impregnate the electrolyte such that binders contained in the sheets are thermally dispersed when the fuel cell is turned on.

The length of the reinforcing ceramic fiber is larger than the thickness of the sheet for holding the electrolyte.

The length of the reinforcing ceramic fiber is not shorter than the thickness of the sheet for holding the electrolyte.

According to the present invention, there is provided a method of manufacturing a sheet containing fiber comprising the steps of:

a first step for mixing ceramic fiber with slurry;

a second step for making the thickness of a blade for casting the slurry containing the ceramic fiber by a doctor blade method to be smaller than the length of the ceramic fiber; and a third step for drying the molded sheet at a predetermined temperature.

In the fourth step, the sheet is degreased at a temperature lower than a range of temperatures at which the sheet is sintered.

According to the present invention, there is provided a ceramic sheet comprising ceramic fiber, wherein the ceramic fiber is disposed substantially in parallel to the surface of the ceramic sheet and the length of the ceramic fiber is larger than the thickness of the sheet.

The sheet for holding the electrolyte, to which the ceramic fiber is mixed, may be a porous member, a polycrystal member or their combination. Although the essential portion of the present invention is, of course, that mixing of the ceramic fiber with the sheet for holding the electrolyte reinforces the sheet, another important fact for reinforcing the sheet is that the lengthwise direction of the fiber substantially runs parallel to the surface of the sheet for holding the electrolyte. Moreover, the length of the ceramic fiber must be an appropriate value adaptable to the thickness of the sheet for holding the electrolyte. In general, the length of the reinforcing ceramic fiber must be larger than the thickness of the sheet for holding the electrolyte.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

DETAILED DESCRIPTION OF THE INVENTION

Embodiments of the present invention will now be described with reference to the drawing.

Figure 1:
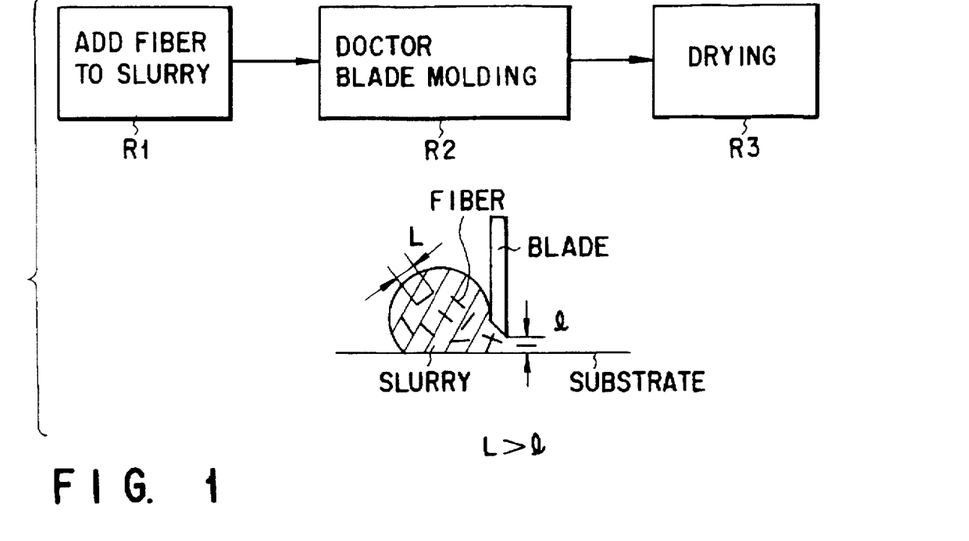
FIG. 1 is a diagram showing the process for manufacturing a green sheet of the layer for holding the electrolyte to which ceramic fiber has been added according to the present invention.

A green sheet made of an electrolyte layer and forming a stacked electrolyte member for a molten carbonate fuel cell is manufactured as shown in FIG. 1 by a method comprising the steps of adding and stirring fiber having a length L (R1); casting slurry having the fiber added thereto by a blade having gap 1 by a doctor blade method to form a sheet-like member, the lengthwise direction of which substantially runs along the surface of a substrate (R2); and, for example, drying the sheet-like member to cause the fiber to run parallel substantially in parallel to the surface of the substrate (R3). The foregoing sheet to which the fiber is mixed may have a porous form or a polycrystal form. Although the essential portion of the present invention is, as a matter of course, that the fiber is mixed with the sheet in order to reinforce the sheet, another important fact is that the lengthwise direction of the fiber is made to run parallel to the surface of the sheet for holding the electrolyte layer in view of reinforcing the sheet. Moreover, the length of the fiber must be appropriately determined to correspond to the thickness of the sheet. In general, the length of the fiber must be larger than the thickness of the sheet.

Figure 3:
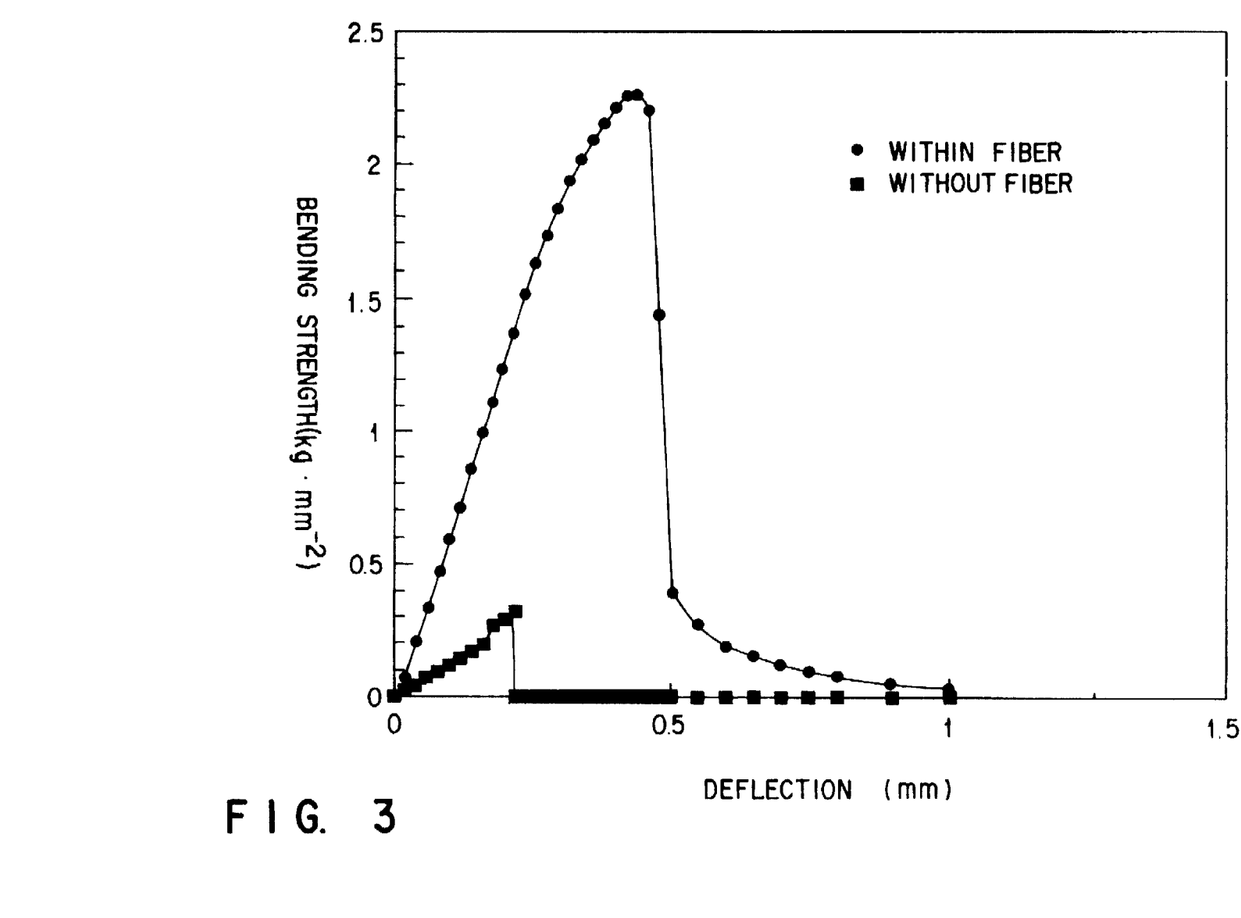
FIG. 3 is a graph showing the relationship between the bending strength and deflection of a sheet to which the fiber is added and a sheet to which the fiber is not added.

FIG. 3 is a graph showing the relationship between the bending strength and deflection of a sheet to which the fiber is added (a sheet having the fiber substantially running parallel to the surface of the sheet) and a sheet to which the fiber is not added. As shown in FIG. 3, the sheet, to which the fiber is added to substantially run parallel to the surface of the sheet, has strong bending resistance and shearing resistance. Therefore, the sheet, to which the fiber is added to substantially run parallel to the surface of the sheet, is able to effectively prevent generation of a large crack in the electrolyte layer.

Figure 2:
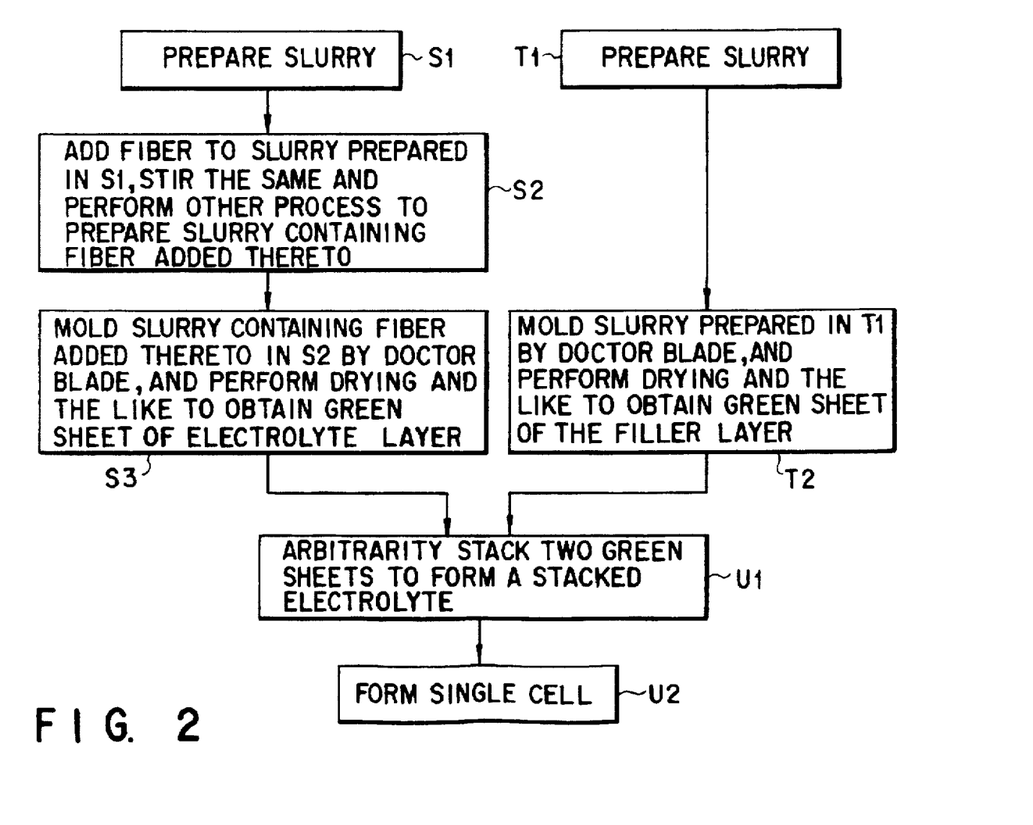
FIG. 2 is a diagram showing a process for forming a laminated member consisting of the green sheet of the layer for holding the electrolyte, to which the ceramic fiber has been added, and green sheet of the filler layer according to the present invention.
Figure 6:
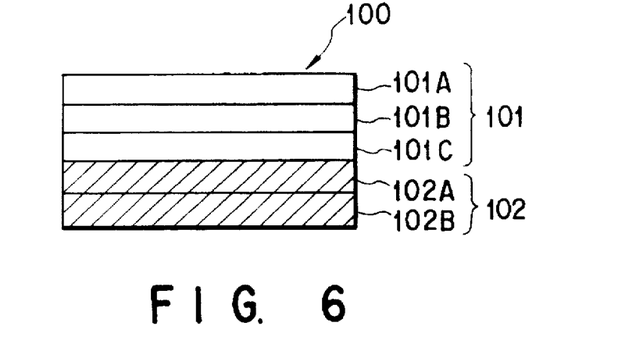
FIG. 6 is a cross sectional view showing an example of the structures of the layer for holding the electrolyte and a filler layer.
Figure 10:
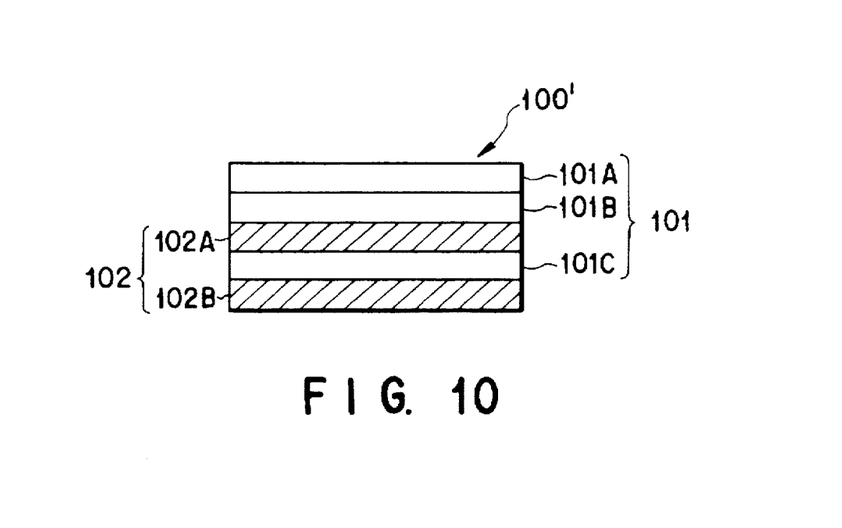
FIG. 10 is a cross sectional view showing another example of the structures of the layer for holding the electrolyte and the filler layer.

The stacked electrolyte member typified by the structure shown in FIG. 6 or 10 is manufactured by a procedure shown in FIG. 2. That is, slurry for forming a green sheet of the electrolyte layer is prepared (S1), the fiber having the length L is added to slurry above and slurry is stirred (S2), and slurry containing the fiber added thereto is casted by the doctor blade method to form a sheet in which the fiber substantially runs parallel to the surface of the substrate, followed by, for example, drying the same so that the green sheet of the electrolyte layer containing the fiber running parallel to the surface of the substrate is obtained (S3).

On the other hand, slurry for manufacturing a green sheet of a filler layer is prepared (T1). Then, slurry above is casted by the doctor blade method, followed by, for example, drying the same so that the green sheet of the filler layer is obtained (T2).

A plurality of the green sheets of the electrolyte layer obtained in step S3 and the green sheets of the filler layer obtained in step T2 are stacked so that the stacked member made of electrolyte is formed (U1). Thus, a single cell can be obtained (U2).

The foregoing process will be described further in detail. Ceramic fiber having a length longer than the thickness of a sheet containing fine powder of lithium aluminate as the main component thereof and arranged to hold the electrolyte is, in a quantity of 3 wt % to 30 wt %, included in the sheet such that the fiber runs parallel to surface of the sheet. Thus, the electrolyte layer is reinforced in order to prevent generation of a large crack in the electrolyte layer attributable to the difference in the thermal expansion between electrodes and the electrolyte layer and between the electrolyte layer and the edge portion.

A cracking filler layer containing, as the main component thereof, powder which is fined during the operation of the cell is combined and stacked with the sheet containing fine powder of lithium aluminate as the main component thereof and arranged to hold the electrolyte. As a result, cracks which are generated when the electrolyte is coagulated because the operation of the cell is interrupted or restarted are caused to be generated around the ceramic fiber disposed in parallel to the surface of the sheet. Thus, the size of each microcracks is reduced to prevent propagation of cracks from the anode to the cathode by the cracking filler layer. Hence, the crossover can be prevented.

If a large crack is generated or a coarse pore is formed due to the deterioration with time, the cracking filler layer containing, as the main component thereof, powder which is fined during the operation of the cell is filled to the crack or the coarse pore to stop the same. As a result, mixing of the atmospheric gas with the anode chamber and the cathode chamber occurring due to direct combustion of the fuel gas and the oxidizing agent gas or defective sealing can be prevented. Thus, the operation characteristic of the cell can be stabilized.

For example, 3 wt % to 30 wt % ceramic fiber made of an oxide, such as $ZrO_2$, $Al_2O_3$ or $LiAlO_2$, which is relatively stable with respect to a carbonate which is an electrolyte, is added to the sheet containing lithium aluminate as the main component thereof and arranged to hold the electrolyte such that the ceramic fiber runs parallel to the surface of the sheet. Thus, the electrolyte layer is reinforced so as to improve the mechanical strength of the layer for holding the electrolyte.

As a result, generation of a large crack in the electrolyte layer can be prevented which takes place attributable to the difference in the thermal expansion occurring between the electrolyte layer and the edge portion and between the electrolyte layer and the electrode when the temperature is raised or lowered.

Moreover, the cracking filler layer made of an oxide of, for example, Fe, Mn or Co, or a composite oxide further containing alkali metal or alkaline earth metal in the form of powder which is fined during the operation of the cell as the time passes is also used so that a broken portion, such as a crack generated in the electrolyte layer or a coarse pore portion in the layer for holding the electrolyte material which deteriorates as the time passes is filled. Thus, the direct combustion reaction between the fuel gas and the oxidizing agent gas can assuredly be prevented. As a result, mixing of the atmospheric gas into the anode chamber and the cathode chamber occurring due to the defective sealing in the edge portion can be prevented.

The example of the present invention will be described further in detail.

Ethanol is added to powder of $LiAlO_2$, followed by mixing the mixture by a ball mill so that $LiAlO_2$ slurry is prepared.

Then, $Al_2O_3$ fiber having a diameter of 10 μm and a length of 0.2 mm to 10 mm, water soluble resin solution and plasticizer are added to $LiAlO_2$ slurry above, followed by stirring the mixture. Thus, $LiAlO_2$ slurry containing the $Al_2O_3$ fiber added thereto is prepared. The length of the added fiber is, in this embodiment, determined to be 0.2 mm to 10 mm which has been deduced in accordance with the thickness of the sheet. Therefore, the length of the fiber may be longer than the foregoing value if the selected fiber is adaptable to the required strength of the sheet.

It is preferable that the length of the fiber to be added be longer than the thickness of the sheet.

Then, vacuum defoaming is performed in a state where the pressure has been lowered so that the viscosity of the slurry is adjusted and ethanol is removed. Then, obtained slurry is casted by a doctor blade, and then ethanol or water is removed and dried at temperature in a range from room temperature to 100° C. so that the green sheet of the electrolyte layer is obtained.

Figure 4:
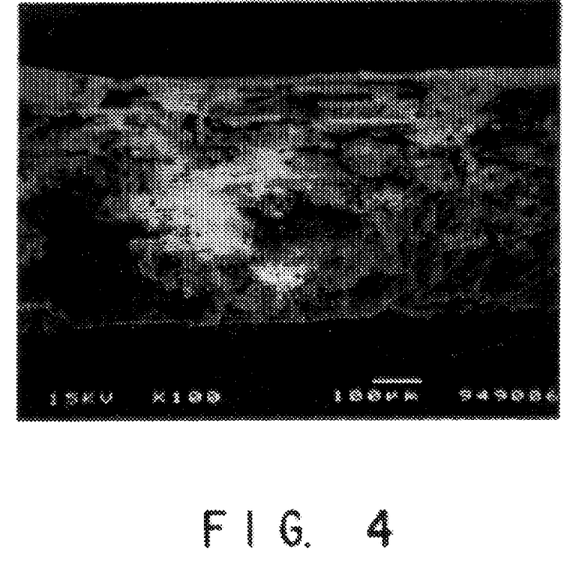
FIG. 4 is a photograph taken with a microscope and showing a layer for holding the electrolyte to which the ceramic fiber has been added.

In order to confirm states of dispersion and configuration of the $Al_2O_3$ fiber in the layer for holding the electrolyte, the green sheet of the layer for holding the electrolyte is introduced into an electric furnace to perform degreasing at 450° C. in the air. Then, the cross sections of the green sheet of the layer for holding the electrolyte were observed with a microscope (a SEM). FIG. 4 is a photograph showing results. As shown in the photograph, a state where $Al_2O_3$ fiber substantially ran parallel to the surface of the sheet was observed.

Figure 5:
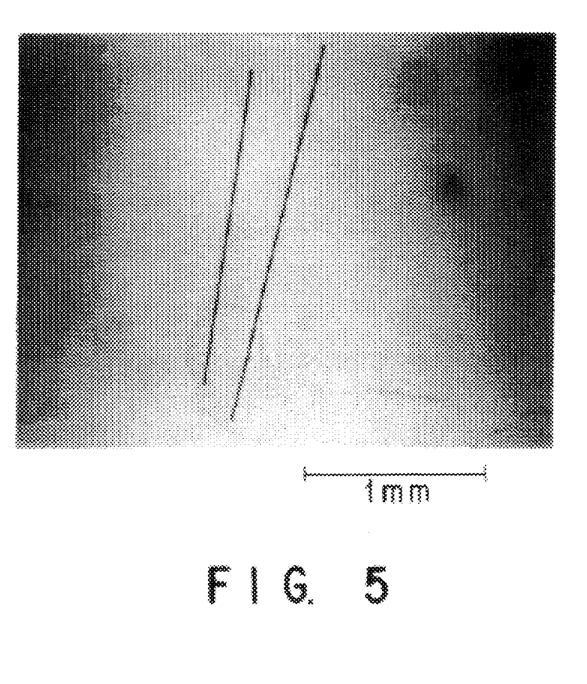
FIG. 5 is a photograph showing the shape of the fiber and taken by a metallographical microscope with which the length of the ceramic fiber added to the layer for holding the electrolyte was observed.

Then, the length of the added $Al_2O_3$ fiber was confirmed such that the green sheet of the layer for holding the electrolyte was introduced into the electric furnace, and then degreasing was performed at 450° C. in the air. Then, the degreased member was taken out, injected into concentrated hydrochloric acid, and then the $LiAlO_2$ holding member was removed while heating the sample. Then, the sample was observed by a metallographical microscope and resulted images were processed. Results of the observation using the metallographical microscope are shown in FIG. 5 which is a photograph. As shown in the photograph, $Al_2O_3$ fiber having a length longer than the thickness of the layer for holding the electrolyte was confirmed.

A method of forming the filler layer will now be described. The water soluble resin solution, the plasticizer and ethanol according to the first embodiment were added to powder of $LiFeO_2$, followed by mixing the mixture in a ball mill so that slurry was prepared.

Then, the prepared slurry was vacuum-degreased under reduced pressure, and the ethanol was removed and the viscosity of the slurry was adjusted. The obtained slurry was casted by a doctor blade, and then ethanol or water was removed and dried at temperature in a range from room temperature to 100° C. Thus, a green sheet of the filler layer is obtained.

Although the water soluble resin solution is, in this embodiment, employed as the binder, a conventional organic binder may be employed to form the layer for holding the electrolyte and the filler layer to obtain a similar effect. Lithium aluminate for holding the electrolyte and the $Al_2O_3$ fiber according to the above-mentioned embodiment may be added as sub-components.

Figure 7:
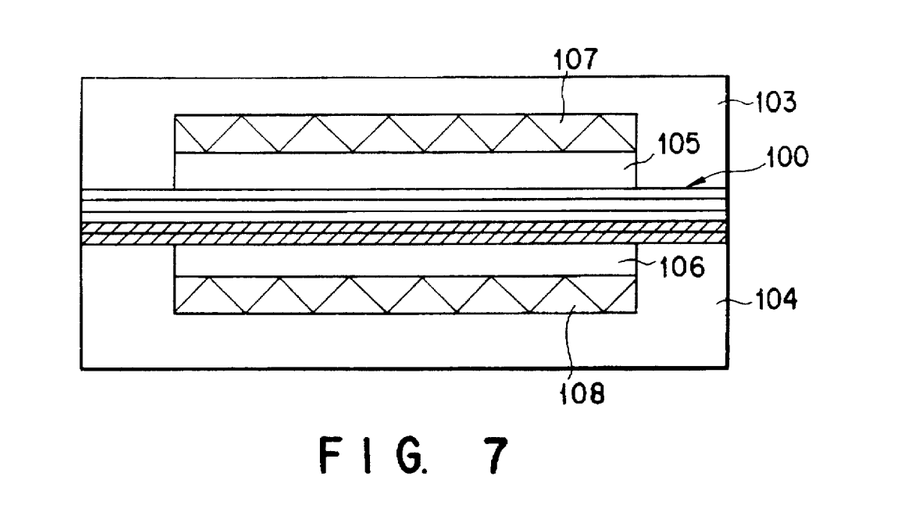
FIG. 7 is a cross sectional view showing an example of the structure of a molten carbonate fuel cell.

Three green sheets of the electrolyte layers 101 (101A, 101B, 101C) each having a thickness of about 0.4 mm and two green sheets 107 (102A, 102B) of the filler layers each having a thickness of about 0.1 mm were stacked as shown in FIG. 6 such that Ni-0.5 $Al_2O_3$ porous member was used as the anode 105 and $Li_xNi_{1-x}O$ porous member was used as the cathode 106 which were combined current collectors 107, 108 and holders 103, 104 as shown in FIG. 7. Then, a single cell comprising electrodes having an effective area of 10 cm$^2$ was used in an electricity generation test.

Figure 8:
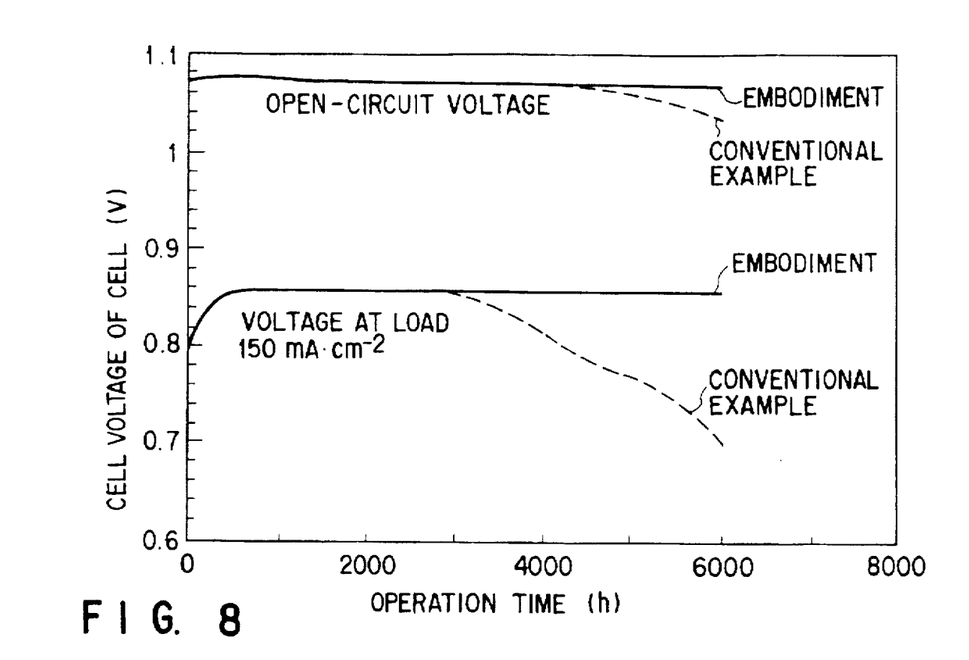
FIG. 8 is a graph showing results of a comparison of continuous generation of electricity between the embodiment and the conventional example.
Figure 9:
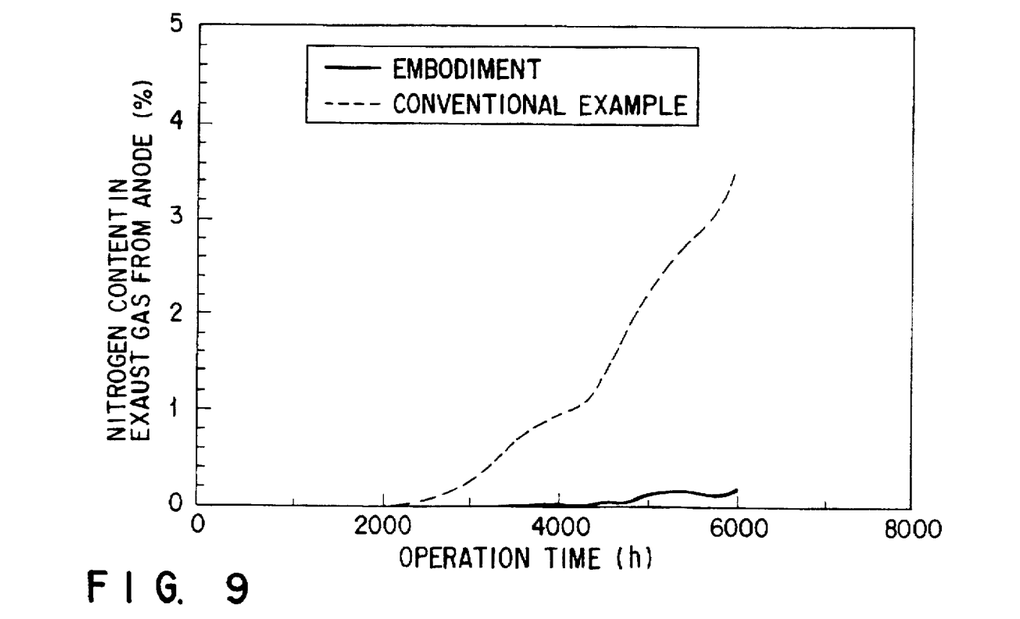
FIG. 9 is graph showing results of a comparison of change in the quantity of nitrogen in exhaust gas from the anode between the embodiment and the conventional example.

The electrolyte was eutectic salt of lithium carbonate and sodium carbonate. The anode was supplied with gas having a composition of $H_2$:$CO_2$:$H_2O$=72:18:10 and the cathode was supplied with gas having a composition of Air:$CO_2$= 70:30. Then, continuous generation of electricity was performed at 650° C. Results are shown in FIGS. 8 and 9. In order to make a comparison, also a result of a test using a conventional electrolyte layer is shown. Also in the case where the conventional electrolyte layer was used, both of the open-circuit voltage and voltage when a load of 0.15 A·cm$^{-2}$ was loaded were stable for about 4000 hours in the initial stage of the generation process. However, both of the voltages above were lowered rapidly after 4000 hours have elapsed (see FIG. 8).

Simultaneously with lowering of the voltage of the cell, quantity of $N_2$ (nitrogen) in the fuel exhaust gas was enlarged. Then, the generation of electricity was completed after 5000 hours have elapsed and a decomposition investigation was performed. As a result, the contact resistance of the single cell didn't increase. A portion considered to be generated due to the crossover mixture of the fuel gas and the oxidizing agent gas was detected in the anode (see FIG. 9). Thus, the voltage drop observed after 4000 hours has elapsed was considered to take place because of the crossover mixture.

As a result, the deterioration in the performance of the cell was considered to take place due to the crossover mixture of the fuel gas and the oxidizing agent gas taken place because of a crack generated in the electrolyte layer when the operation of the cell was started. The foregoing phenomenon cannot easily be observed for 3000 hours after the generation of electricity has been started but it is considered to become obviously after 4000 hours have elapsed.

On the other hand, both of the open-circuit voltage and the voltage under the load of 0.15 A·cm$^{-2}$ of this embodiment were significantly stable until 5000 hours have elapsed. Moreover, the contact resistance did not increase and the quantity of nitrogen in the fuel exhaust gas did not increase.

Although this embodiment employed the combination shown in FIG. 6, another combination shown in FIG. 10 may be employed to attain a similar effect from the filler layer. In the case where the filler layer is formed adjacent to the anode, the components forming the filler layer are affected by the atmosphere of the anode and thus reduced during the operation of the cell so that fining as the lapse of time is inhibited. Therefore, satisfactory stopping function and required function for filling the coarse pore cannot be obtained adjacent to the anode. A short circuit phenomenon easily occurs in the cell, thus raising a possibility that the life time is shortened. However, the above-mentioned embodiment in which no filler layer is formed adjacent to the anode is able to prevent the above-mentioned problem.

The above-mentioned green sheet of the electrolyte layer and the green sheet of the filler layer were stacked such that Ni-0.5 wt % $Al_2O_3$ porous member was used as the anode and $Li_xNi_{1-x}O$ porous member was used as the cathode and then combined to form an electrolyte layer. Then, a thus-obtained single cell comprising electrodes having an effective area of 10 cm$^2$ was subjected to an electricity generation test so that a heat cycle characteristic was examined. Results will now be described.

Eutectic salt of lithium carbonate and sodium carbonate was employed as the electrolyte. The anode was supplied with gas having a composition of $H_2$: $CO_2$: $H_2$ $_O$=72 18:10 and the cathode was supplied with gas having a composition of Air:$CO_2$=70:30. Then, generation of electricity was performed at 650° C. and a heat cycle with a rate of raising and lower the temperature of 30° C. h$^{-1}$ was performed every 500 hours.

Figure 11:
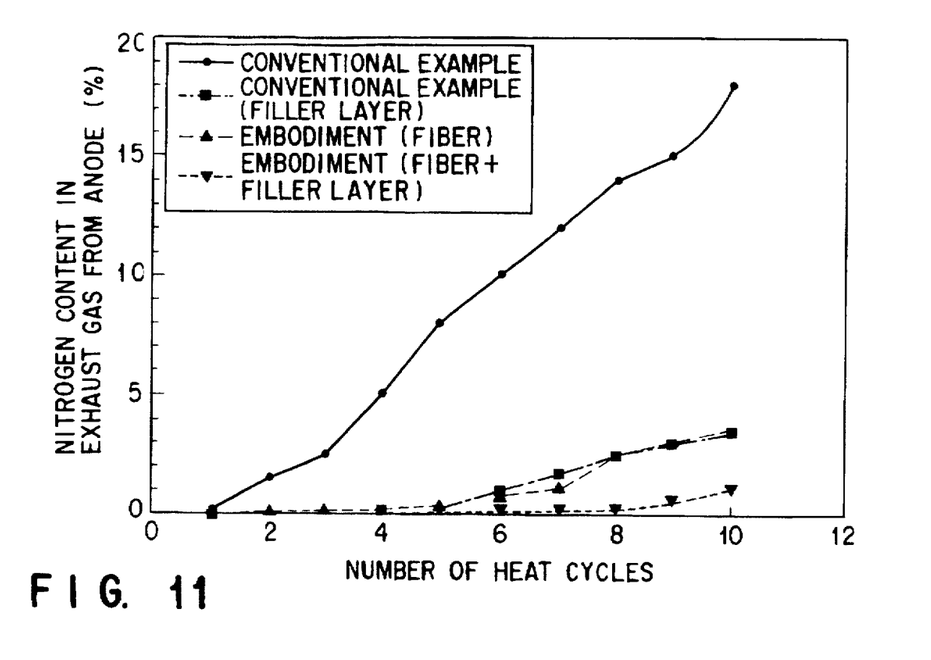
FIG. 11 is a graph showing the performance of cells and quantities of nitrogen in the anode exhaust gas between the embodiment and the conventional example.

Change in the quantity of nitrogen in the exhaust gas from the anode with respect to the performance of the cell is shown in FIG. 11. In order to make a comparison, the following structures were tested:

(a) A structure in which the single cell was formed by the conventional electrolyte layer;

(b) A structure in which the single cell was formed by only the green sheet of the electrolyte layer according to the above-mentioned embodiment; and (c) A structure in which the cracking filler layer for the electrolyte layer according to the above-mentioned embodiment was inserted into the conventional electrolyte layer to form a single cell.

A structure in which both of the cracking filler layer and electrolyte layer according to the above mentioned embodiment.

As can be understood from FIG. 11, the structure (a) having only the conventional electrolyte layer resulted in the quantity of nitrogen being enlarged in the exhaust fuel gas from the second heat cycle. Thus the performance of the cell deteriorated rapidly. As a result of the decomposition investigation, a crack considered to be generated due to the heat cycle was observed in the reaction portion of the electrolyte layer.

In the case of the structure (b) in which only the electrolyte layer according to the embodiment was used, the quantity of nitrogen was slightly enlarged at the second heat cycle. However, the performance of the cell did not deteriorate. The performance was allowed to maintain until the fifth cycles of the heat cycles at which the quantity of nitrogen in the exhaust fuel gas was enlarged considerably and thus the performance of the cell deteriorated. As a result of the decomposition investigation, no crack was observed by the naked eye in the electrolyte layer. As a result of gas chromatography, generation of microcracks was considered.

The cell having the structure (C), in which the cracking filler layer for the electrolyte layer according to the above-mentioned embodiment was inserted into the conventional electrolyte layer, was free from enlargement of the quantity of nitrogen until the fifth heat cycle was completed. However, the quantity of nitrogen was rapidly enlarged in the exhaust fuel gas from the sixth heat cycle. Thus, the performance of the cell deteriorated considerably.

As a result of the decomposition investigation, a crack considered to be generated when the temperature was raised or during the heat cycle was observed. However, the cracking filler layer for the electrolyte layer according to the embodiment was filled in the cracked portion so that a color change was observed along the crack. As a result of existence of the cracking filler layer for the electrolyte layer according to the embodiment, the cell withstood five heat cycles. In the case (d) where both of the electrolyte layer and the cracking filler layer according to the embodiment were used, the single cell withstood eight times of heat cycles. Moreover, enlargement of the quantity of $N_2$ attributable to the crossover was substantially prevented. Although the quantity of $N_2$ was somewhat enlarged after the tenth heat cycle, the cell exhibited substantially the same performance as that in the initial stage of the test even with the above-mentioned amount of cross leak. Therefore, the electrolyte layer and the cracking filler layer according to the embodiment were effective to withstand the heat cycle.

In order to examine the relationship between the quantity of the added $Al_2O_3$ fiber and the strength, evaluation tests outside the cell were performed. By employing the above-mentioned method, a plurality of sheets for holding the electrolyte containing the $Al_2O_3$ fiber in different quantities were manufactured. The sheets for holding the electrolyte was cut to have size 20 mm×50 mm. Each cut sample was vertically held between alumina plates. Each of twenty samples was applied with a load of 2 kgf·cm$^{-2}$, followed by degreasing the same in oxidizing agent gas (Air:$CO_2$=80:20) at 450° C.

Figure 12:
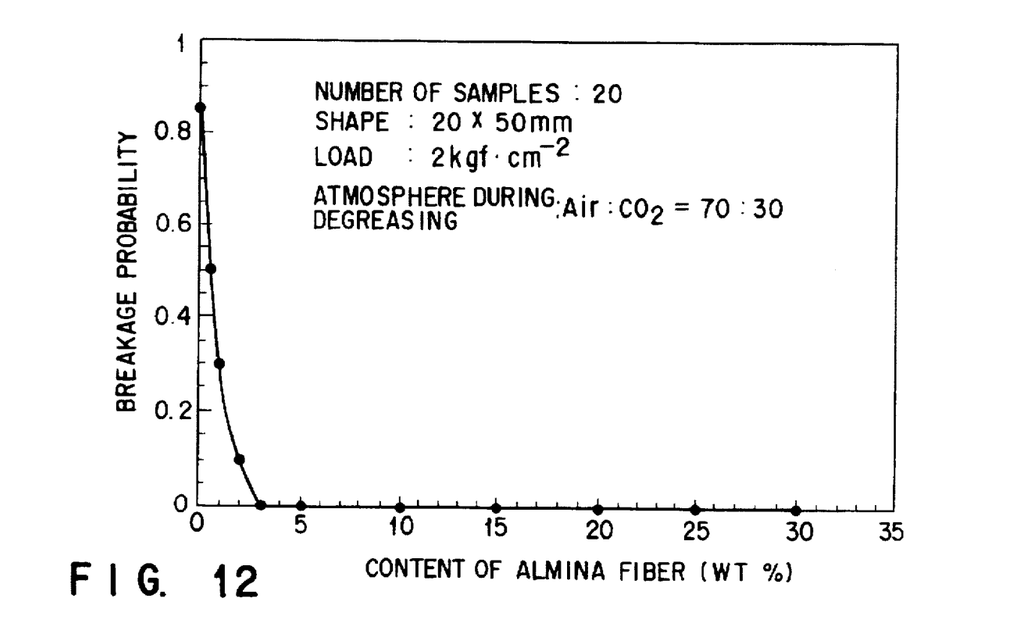
FIG. 12 is a graph showing the quantity of added alumina fiber and breakage rate when degreasing has been performed.

After the degreasing process, the samples containing the $Al_2O_3$ fiber in different quantities were taken out to evaluate the state of breakage and obtain percentage of broken samples. Results are shown in FIG. 12. A fact was found that the sample was free from breakage if the quantity of addition was 3 wt % or greater.

If the quantity of the $Al_2O_3$ fiber is not less than 3 wt % and less than 30 wt %, a similar effect can be obtained. If the quantity is not more than 3 wt %, a required reinforcing effect against heat cycle shock cannot be obtained. If the quantity is not less than 30 wt %, a somewhat reinforcing effect against thermal shock can be obtained. However, the mold ability when the sheet for holding the electrolyte deteriorates excessively. In this case, a uniform surface cannot be formed, thus causing a problem to arise when the cell is assembled. Moreover, the force of the sheet for holding the electrolyte is weakened and, therefore, the electrolyte cannot act as required.

In view of the foregoing, the appropriate ratio of a $LiAlO_2$ powder for holding the electrolyte and the $Al_2O_3$ fiber is 97:3 to 70:30. In the case where the length of the $Al_2O_3$ fiber is shorter than the thickness of the green sheet of the electrolyte layer, the ratio at which the $Al_2O_3$ fiber is dispersed in the planar direction of the electrolyte layer is lowered. As a result, the reinforcing effect becomes unsatisfactory. Moreover, the $Al_2O_3$ fiber is distributed vertically and serves as a start point of a short circuit phenomenon. Therefore, it is preferable that the length of the $Al_2O_3$ fiber be longer than the green sheet of the electrolyte layer.

Although the example in which $Al_2O_3$ particles or $LiAlO_2$ particles are added as the crack arrester is omitted from description, the electrolyte layer according to this embodiment can be formed if the above-mentioned ceramic particles are added as the crack arrester. Also in this case, the molten carbonate fuel cell is able to have satisfactory performance and durability against the heat cycle.

The method of adding the fiber according to the present invention is not limited to the molten carbonate fuel cell and therefore it may be adapted to another fuel cell if the strength of the electrolyte layer is required to be enlarged. That is, if the ceramic fiber substantially runs parallel to the plane of the electrolyte layer similar to the embodiment, the strength of the electrolyte layer for another fuel cell can be improved. When the structure of the present invention is applied to another fuel cell, employment of ceramic fiber of a type stable with respect to the operation condition of the fuel cell attains a further satisfactory effect.

Although $LiAlO_2$ is employed as the material for holding the electrolyte in the foregoing description, the crystal system of the holding material is not limited. Any one of α-type crystal system, β-type crystal system and γ-type crystal system and their mixture crystal system may be employed.

Moreover, the manufacturing method according to the present invention may be applied to a process for manufacturing a structure except the member for forming the fuel cell. For example, the manufacturing method according to the present invention may be employed to manufacture a ceramic substrate or a ceramic structure made of a usual material, such as MgO, $Al_2O_3$, AlN, $Si_3N_4$ or $SiO_2$ or their mixture. As compared with the conventional manufacturing method, a satisfactory effect of improving the strength can be obtained.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A fuel cell comprising a plurality of stacked single cells in each of which an electrolyte layer is held between an anode and a cathode and a separator provided between said anode and said cathode, wherein said electrolyte layer includes:

a sheet for holding an electrolyte containing, fine powder having a function of holding the electrolyte, reinforcing ceramic fiber disposed in said sheet for holding the electrolyte to substantially run parallel to the surface of said sheet for holding the electrolyte and the length of said reinforcing ceramic fiber is larger than the thickness of said sheet for holding the electrolyte.

2. A fuel cell according to claim 1, wherein the quantity of said added reinforcing ceramic fiber is 3 wt % to 30 wt %.

3. A fuel cell comprising a plurality of stacked single cells in each of which an electrolyte layer is held between an anode and a cathode and a separator provided between said anode and said cathode, wherein said electrolyte layer is in the form of a stacked member formed by combining a sheet for holding the electrolyte containing, as the main component thereof, fine powder having a function of holding the electrolyte and made of a porous body and a cracking filler layer sheet containing, a powder which is fined during a operation of said fuel cell, said electrolyte layer containing reinforcing ceramic fiber disposed in said sheet for holding the electrolyte to substantially run parallel to the surface of said sheet made of said porous body and the length of said reinforcing ceramic fiber is larger than the thickness of said sheet for holding the electrolyte.

4. A fuel cell according to claim 3, wherein said cracking filler layer is disposed more adjacent to said cathode than said anode.

5. A fuel cell according to claim 3, wherein said sheet for holding the electrolyte and said cracking filler layer sheet are allowed to impregnate said electrolyte such that binders contained in said sheets are thermally dispersed when said fuel cell is turned on.

* * * * *